Dec. 4, 1928.
H. A. TUTTLE
REVERSING MECHANISM
Filed Jan. 7, 1927
1,694,295
3 Sheets-Sheet 2
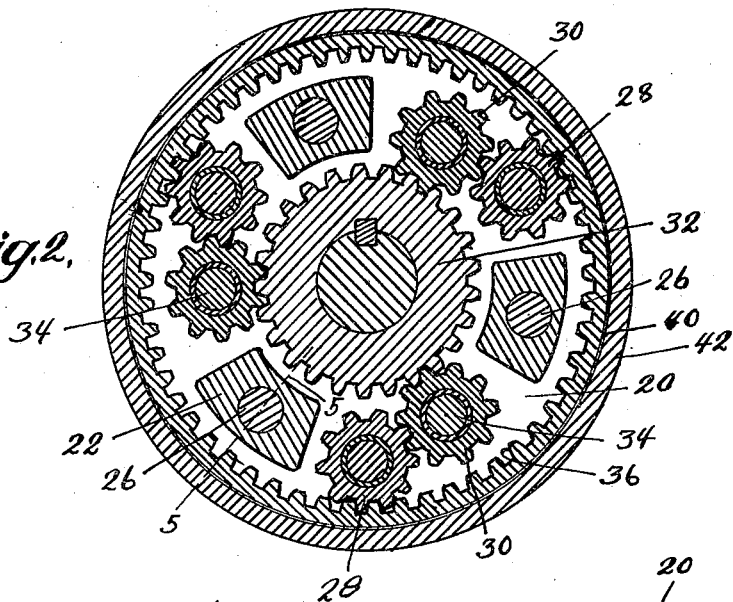
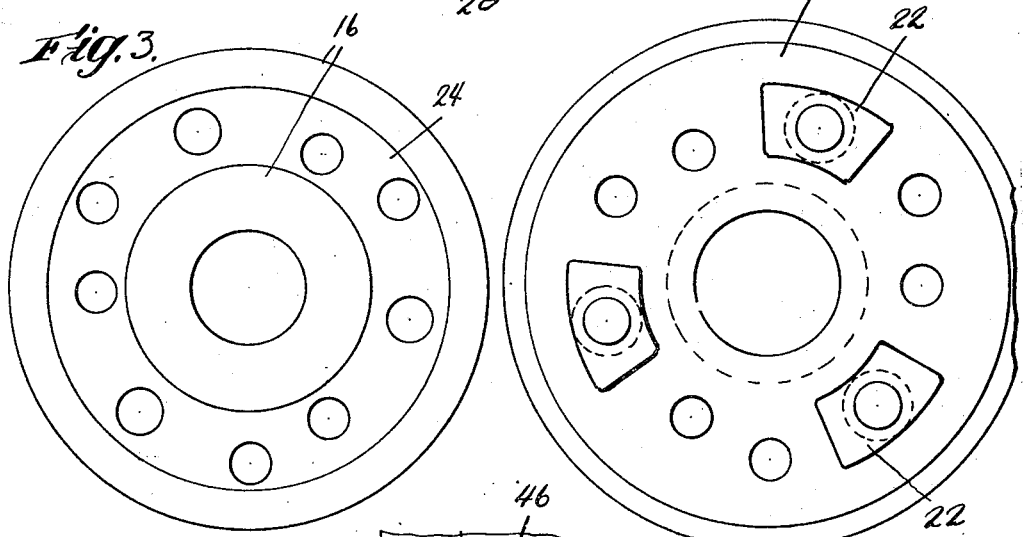
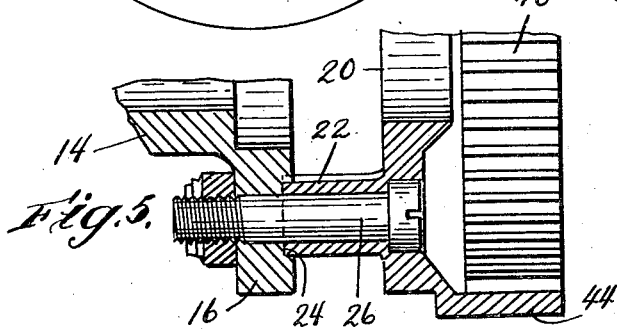

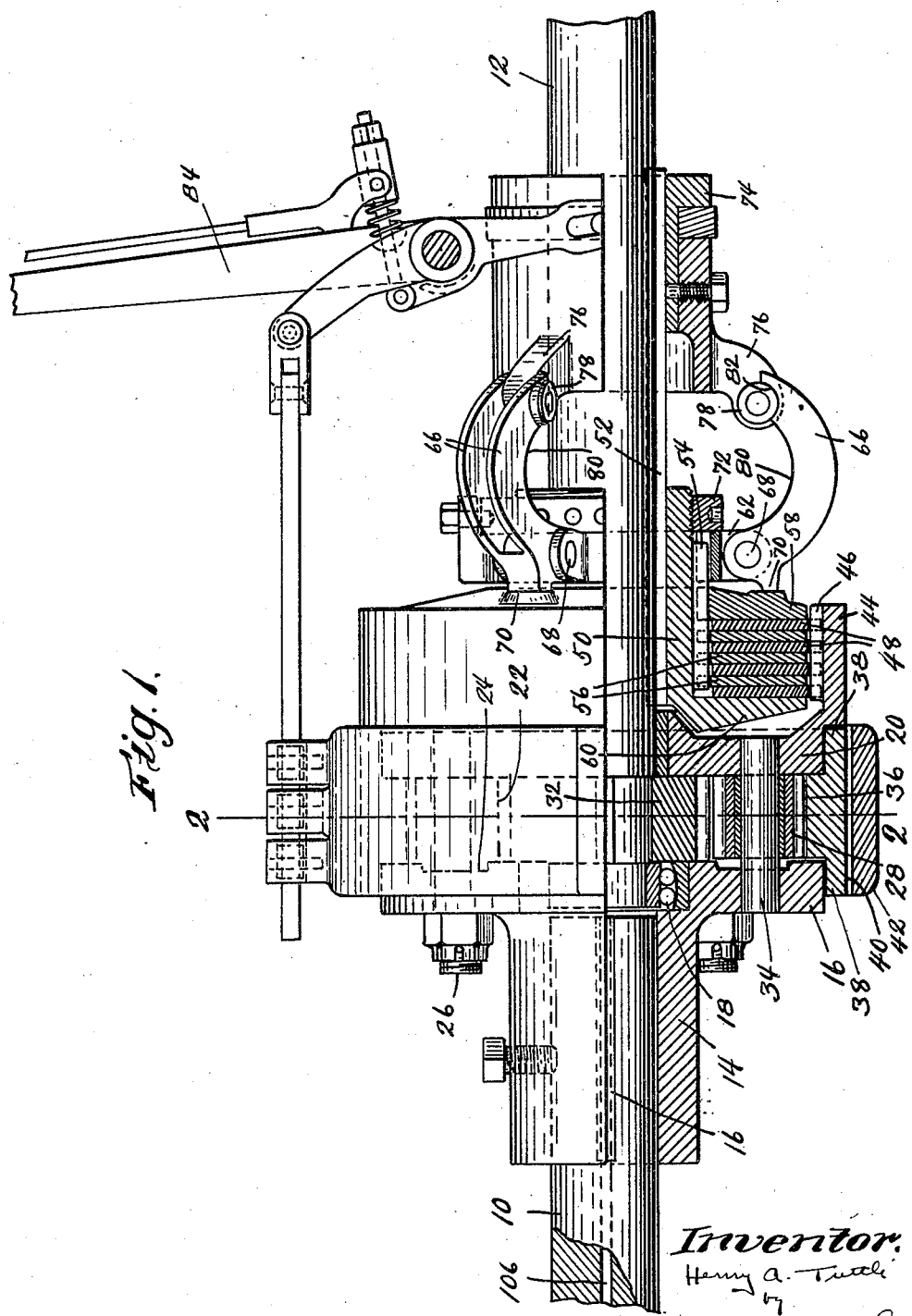

Dec. 4, 1928.
H. A. TUTTLE
1,694,295
REVERSING MECHANISM
Filed Jan. 7, 1927  3 Sheets-Sheet 3
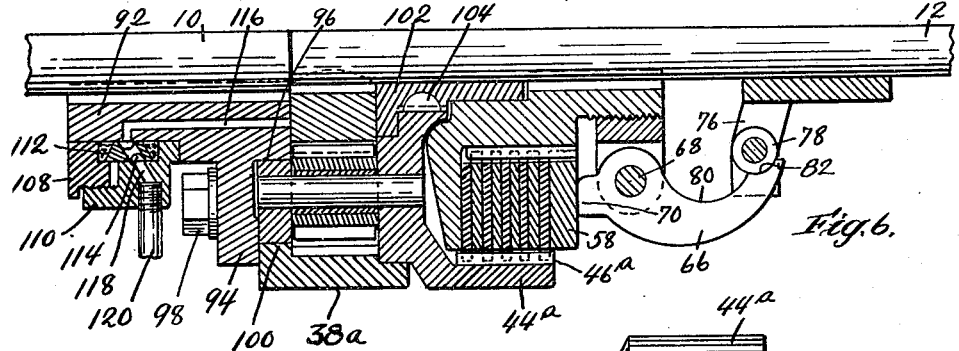
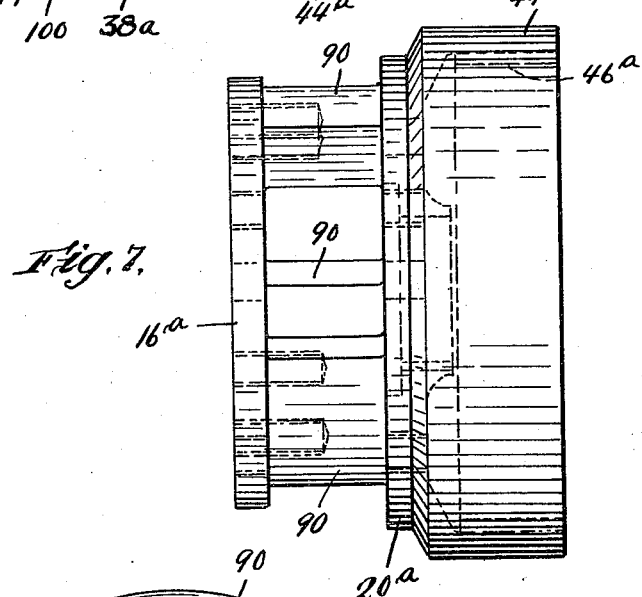
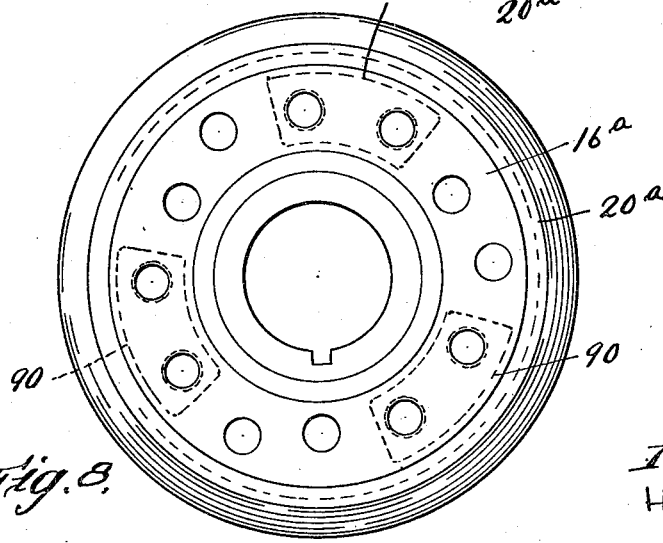

Patented Dec. 4, 1928.

1,694,295

UNITED STATES PATENT OFFICE.

HENRY A. TUTTLE, OF UPTON, MASSACHUSETTS.

REVERSING MECHANISM.

Application filed January 7, 1927. Serial No. 159,544.

This invention relates to reversing mechanisms of the type comprising driving and driven shafts with gearing connecting said shafts for reverse drive and clutch mechanism connecting said shafts for forward drive and has for an object a simple, reliable and inexpensive construction wherein the driving and driven shafts are directly connected for direct drive.

A further object is the provision of planetary gearing and an internal gear associated therewith, which gear normally is adapted to float on the planetary gearing, free from driving relation therewith, and also free from driving connection with both the driving and driven shafts.

A yet further object of the invention is the provision of a solid or one-piece gear carrier for the planetary gearing elements in combination with the floating internal gear and with the arrangement of the planetary gearing and internal gear such that the internal gear can be removed in an axial direction from the gear carrier.

A yet further object is generally to improve the construction and operation of reversing mechanism.

The reversing mechanism comprising this invention comprises briefly a gear carrier fixed to the driving shaft and having planetary gears meshing with a spur gear fixed to the driven shaft, means to clutch the gear carrier directly with the driven shaft for direct drive; and a floating internal gear in mesh with and surrounding the gearing elements and having brake mechanism to hold it stationary to secure reverse drive.

Fig. 1 is a side elevation partly in section of a reversing mechanism embodying the invention.

Fig. 2 is a section along line 2—2 of Fig. 1.

Fig. 3 is an elevation of the inner face of the left hand plate of the gear carrier.

Fig. 4 is an elevation of the inner face of the right hand plate of the gear carrier.

Fig. 5 is a sectional detail taken along line 5—5 of Fig. 2.

Fig. 6 is a partial side elevation of a modified form of reversing gearing embodying the invention.

Fig. 7 is a side elevation of the solid planetary gear carrier, the gears being removed.

Fig. 8 is a front view of the gear carrier of Fig. 7.

As here shown, the reversing mechanism embodying the invention comprises a driving shaft 10 and a driven shaft 12. A gear carrier is fixed to said driving shaft and includes a hub 14 which is fixed by a key 16 to the end of said shaft. A circular disc or plate 16 is integral with and outstands radially from said hub 14 and is provided with an annular recess therein in which a ball bearing 18 for the end of the driven shaft 12 is received. Said gear carrier also includes a similar plate 20 which has a loose bearing on the driven shaft and which is disposed thereon in spaced relation with said plate 16. Said plate 20 is provided with three integral feet 22 which outstand axially from the inner face of said plate and are received in an annular groove 24 in the inner face of the plate 16. Bolts 26 are extended through said feet 22 and apertures in said plate 16 whereby to clamp said plates 16 and 20 rigidly together in spaced relation and to form in effect an integral structure. Said gear carrier is provided with sets of planetary gearing elements which are disposed between the feet 22. Each set of gears comprises an outer pinion gear 28 and an inner pinion gear 30, see Fig. 2, which are in constant mesh with each other. A spur gear 32 is keyed to the end of said driven shaft 12 within said gear carrier and said inner pinion gears 30 are in constant mesh with said shaft gear. Said pinion gears are rotatable on pins 34 carried by the spaced plates 16 and 20 of the gear carrier.

In accordance with this invention, an internal gear 36 surrounds said pinion gears and is in constant mesh with the outer pinion gears 28. Said internal gear is provided with lateral annular flanges 38 which surrounds the outer peripheries of the plates 16 and 20 of the gear carrier whereby to provide a bearing support for said internal gear on said gear carrier.

Under some instances, the internal gear may be supported entirely by the pinion gears, although this method is not preferred. The outer face 40 of said internal gear is cylindrical and constitutes a brake drum which is adapted to be engaged by the flexible brake band 42 whereby to hold said internal gear stationary and thereby condition the gearing mechanism for reverse drive. When the brake band is released from the internal gear and the gearing mechanism is set for direct drive, or is in neutral, the internal gear is free from positive connection with any element of the mechanism and floats on the gear carrier and about the planetary gears and is free for independent rotation at will.

The clutch mechanism to secure direct drive includes a cylinder 44 which is integral with the plate 20 and provides an enclosure for the clutch elements. The inner face of said cylinder is formed with internal gear teeth 46 and a set of clutch plates 48 having an external gear tooth formation on their outer peripheries are disposed within said cylinder with their teeth in mesh with the internal teeth of said cylinder. A clutch plate carrier 50 is fixed to the driven shaft 12 by a key 52 and has external gear teeth 54 thereon. A set of clutch plates 56 having internal gear teeth thereon are carried by said carrier with their internal gear teeth in mesh with the gear teeth of said carrier. One of the latter set of clutch plates also constitutes a pressure plate 58 which is adapted to bear against the clutch plates and move them axially into clutching engagement. Said clutch plate carrier 50 is provided with a radially outstanding flange 60 which constitutes an abutment plate and is adapted to support the clutch plates against the clutching pressure.

The operating mechanism for the clutch includes a ring 62 which surrounds said clutch plate carrier 50 and has internal gear teeth which are in mesh with the gear teeth 54 of said carrier. Links 66 are pivoted on pins 68 carried by said ring 62 and said links have projections 70 which are adapted to bear against said pressure plate 58 to set the clutch. Said ring is held against axial movement toward the right by a ring 72 which is adjustably screw threaded on the end of said clutch plate carrier 50. Said links 66 are moved outwardly to set the clutch by means of a sleeve 74 which is slidable on the driven shaft and is caused to rotate therewith by the key 52. Said sleeve is provided with outstanding ears 76 which carry rollers 78. Said links 66 are provided with inner arcuate faces 80 against which said rollers 78 are adapted to bear during a movement of said sleeve 74 toward the right whereby to force said arms outwardly to set the clutch. Notches 82 are provided in the ends of said arms 66 into which said rollers 78 are adapted to be received whereby to lock said clutch releasably in set condition. The clutch and brake mechanisms are adapted to be operated selectively from a neutral position by an operating handle 84 through actuating mechanism of more or less common construction.

In the modification illustrated in Figs. 6, 7 and 8, the gear carrier has a one-piece construction, the side plates 16$^a$ and 20$^a$ being integral with the spacing ribs 90 thereby to provide a very rigid support for the pinion gears. In this construction, a hub 92 is fixed to the driving shaft and has a radially outstanding flange 94. The plate 16$^a$ of the gear carrier is in the form of a ring and has an internal axial passage adapted to be received on the ledge 96 of said hub. The outer face of said plate 16$^a$ is adapted to bear against the inner face of the flange 94. Bolts 98 extend through said flange and are screwthreaded into the ribs 90 of the gear carrier whereby to secure the gear carrier firmly yet detachably to said flange and consequently to the driving shaft. The outer diameter of the plate 16$^a$ is somewhat less than the internal diameter of the gear teeth of the floating internal gear 38$^a$ so that said internal gear can be withdrawn from the gear carrier by a movement axially thereof when said gear carrier is disconnected from the flange 94 and withdrawn rearwardly. This construction greatly simplifies the manufacturing operations and also the ease of assembling and disassembling the mechanism.

The floating internal gear is provided with an inwardly directed annular flange 100 which has a bearing on the periphery of the plate 16$^a$ of the gear carrier. The flange 94 cooperates with the plate 20$^a$ of the gear carrier in holding the internal gear against excessive axial movement.

In this modification, the bearing between the end of the driven shaft and the plate 16 of Fig. 1 is eliminated, and the plate 20$^a$ is provided with an elongated bearing for the driven shaft, which bearing extends for a substantial distance into the clutch-chamber provided by the annular drum 44$^a$. Said bearing is in the form of a bushing 102 which is a driving fit in the plate 20$^a$ of the gear carrier and is secured therein against rotation by a key 104. Said bushing is adapted to be inserted permanently in place after the internal gear teeth 46$^a$ of the drum have been machined, since otherwise the bushing would strike and interfere with the operation of the tooth cutter.

In the construction shown in Fig. 1, lubrication of the gearing is adapted to be effected through an axial passage 106 in the driving shaft 10 through which passage oil is adapted to flow into the gearing from the engine pump or in any other usual or suitable lubricating device. In the modification shown in Fig. 6, other means are provided to lubricate the gearing. Said means includes a ring 108 which is carried by a stationary support not shown and surrounds the end of the hub 92. A ring 110 is screw threaded adjustably on said stationary ring 108 over said hub 92 and an annular packing 112 is located in a groove formed in said rings. Said annular packing is provided with an oil passage 114 therethrough which communicates with a passage 116 extended through the hub 92 into the gear space of the gearing. One of said rings, as the ring 110, is provided with a passage 118 through which a suitable lubricant as grease or oil is adapted to be supplied in any suitable manner as by a pipe 120.

The construction may be otherwise modified without departing from the spirit of the invention.

I claim:

1. Reversing gearing having the combination of aligned driving and driven shafts, gearing connecting said shafts for reverse drive including a spur gear fixed to said driven shaft, a gear carrier fixed to said shafts, said gear carrier comprising a pair of detachably connected and spaced circular plates, pinion gears disposed between and carried by said plates some of which mesh with said spur gear, an internal gear disposed between and held against axial movement by said plates and surrounding and meshing with others of said pinion gears and overlying and having a rotatable bearing support on said carrier, one of said plates having an axial cylindrical extension, clutch plates disposed within and carried by said cylindrical extension, other and cooperating clutch plates connected with said driven shaft, means to move said clutch plates into driving engagement for forward drive, and brake mechanism to hold said internal gear stationary for reverse drive, said internal gear being free to float on said gear carrier during forward drive.

2. Reversing mechanism including a gear carrier having spaced plates one of which is larger in diameter than the other, planetary gearing elements carried by and disposed between said plates and extended outwardly beyond at least the smaller one of said plates, and an internal gear surrounding said gear carrier and gearing elements and forming the closure for the space between said plates and being loose on and closely surrounding both of said plates and having an internal diameter at least as great as the smaller one of said plates, whereby said internal gear can be removed from the aforesaid relation by an axial movement thereof.

3. Reversing mechanism comprising the combination of driving and driven shafts, gearing connecting said shafts including a gear carrier, planetary gearing elements carried by said gear carrier, a flange fixed to said driving shaft, means removably connecting said gear carrier and flange rigidly together, and a floating internal gear meshing with said planetary gearing elements and located on said gear carrier behind said flange.

4. Reversing gearing comprising the combination of driving and driven shafts, gearing connecting said shafts including a gear carrier, pinion gears carried by said carrier, an internal gear surrounding said gear carrier and pinion gears and having a bearing on said carrier, a flange fixed to said driving shaft, and means detachably connecting said flange and gear carrier fixedly together, said flange constituting means to hold the internal gear against axial displacement in one direction.

5. Reversing gearing comprising the combination of driving and driven shafts, gearing connecting said shafts including a gear carrier, pinion gears carried by said carrier, an internal gear surrounding said gear carrier and pinion gears and having a bearing on said carrier, a flange fixed to said driving shaft, and means detachably connecting said flange and gear carrier fixedly together, said flange constituting means to hold said internal gear against axial displacement in one direction, and said gear carrier having means to hold said internal gear against axial movement in the opposite direction.

6. Reversing mechanism comprising the combination of driving and driven shafts, gearing connecting said shafts including a gear carrier having spaced circular plates of unequal diameter connected rigidly in spaced relation, pinion gears carried by and disposed between said plates, an internal gear movable in an axial direction from the smallest carrier-plate into meshing relation with said pinion gears, said plate providing a bearing support for said internal gear and said largest plate providing an abutment which restrains said internal gear against axial displacement in one direction, a flange fixed to said driving shaft, means rigidly connecting said flange and said smallest carrier plate rigidly together, said flange outstanding beyond the periphery of said smallest carrier-plate whereby to provide an abutment restraining said internal gear against axial displacement in the opposite direction.

7. Reversing mechanism having the combination of driving and driven shafts, gearing connecting said shafts for reverse drive including a gear carrier carried by said driving shaft and overlying said driven shaft and having a cylindrical drum surrounding said driven shaft and providing a clutch-plate compartment, internal gear teeth carried by said drum, and a bushing carried by said gear carrier and providing a bearing for said driven shaft, said bushing extended into said clutch plate compartment and having a removable connection with said gear carrier.

8. The combination of a shaft, a plate surrounding said shaft and having a cylindrical extension cooperating with said plate to form a clutch plate compartment, and a bushing carried by said plate and extended into said clutch plate compartment and providing a bearing for said shaft, said bushing having a removable connection with said plate.

9. Reversing mechanism including the combination of aligned driving and driven shafts, gearing connecting said shafts for reverse drive including a pinion carrier fixed to said driving shaft, pinion gears carried by said carrier, an internal gear surrounding said pinion gears and in mesh with at least certain thereof, a brake to hold said internal gear stationary to set said gearing for reverse drive, said internal gear at other times being free to rotate at will, clutch mechanism to connect said shafts for forward drive and exclude said gearing including clutch plates surrounding said driven shaft and located at one side of said pinion carrier, which plates are connected respectively with said driven shaft and pinion carrier, an abutment plate fixed to said driven shaft between said clutch plates and pinion carrier, and clutch operating mechanism carried by said driven shaft operable to press said plates together against said abutment plate.

In testimony whereof, I have signed my name to this specification.

HENRY A. TUTTLE.